United States Patent
Vitebsky et al.

(10) Patent No.: US 7,433,703 B2
(45) Date of Patent: Oct. 7, 2008

(54) METHOD FOR ALLOCATING RESOURCES IN A WIRELESS COMMUNICATION SYSTEM

(75) Inventors: Stan Vitebsky, Morristown, NJ (US); Yang Yang, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 659 days.

(21) Appl. No.: 11/153,924

(22) Filed: Jun. 16, 2005

(65) Prior Publication Data

US 2006/0286992 A1    Dec. 21, 2006

(51) Int. Cl.
*H04B 7/00* (2006.01)
*H04Q 7/20* (2006.01)

(52) U.S. Cl. .................. 455/522; 455/69; 455/452.2; 455/435.3; 370/437; 370/455; 370/318

(58) Field of Classification Search ............. 455/512, 455/522, 69, 425, 67.11, 67.13, 423, 127.1, 455/561, 452.2, 435.3, 131–135; 370/318, 370/342, 355, 208, 335, 338, 328, 229, 230, 370/278, 331, 333, 235, 395.21, 441, 444, 370/455

See application file for complete search history.

(56) References Cited

U.S. PATENT DOCUMENTS

| | | | | |
|---|---|---|---|---|
| 7,158,557 B2 * | 1/2007 | Lee et al. | ...... | 375/147 |
| 7,277,406 B2 * | 10/2007 | Kim et al. | ...... | 370/318 |
| 2002/0077138 A1 * | 6/2002 | Bark et al. | ...... | 455/522 |
| 2005/0111391 A1 * | 5/2005 | Oki et al. | ...... | 370/311 |
| 2005/0265282 A1 * | 12/2005 | Gross et al. | ...... | 370/329 |
| 2006/0154684 A1 * | 7/2006 | Meiyappan | ...... | 455/522 |
| 2007/0150215 A1 * | 6/2007 | Spitaels et al. | ...... | 702/61 |

* cited by examiner

*Primary Examiner*—Sujatha Sharma

(57) ABSTRACT

The present invention provides a method for allocating resources in a wireless communication system. The method may include selecting at least one resource control bit that is not to be transmitted. The at least one resource control bit is selected based on at least one priority associated with the at least one resource control bit.

15 Claims, 2 Drawing Sheets

METHOD FOR ALLOCATING RESOURCES IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Conventional wireless communication systems include one or more base stations, which may also be referred to as node-Bs or Access Network (AN), for providing wireless connectivity to one or more mobile units, which may also be referred to using terms such as user equipment, subscriber equipment, and Access Terminals (AT). Exemplary mobile units include cellular telephones, personal data assistants, smart phones, text messaging devices, laptop computers, desktop computers, and the like. Each base station may provide wireless connectivity to one or more mobile units, such as the mobile units in a geographical area, or cell, associated with the base station. Each mobile unit may also maintain one or more wireless communication links, or legs, with one or more base stations. For example, a mobile unit can maintain a plurality of wireless communication links with an associated plurality of base stations. A mobile unit that is in communication with more than one base station over more than one leg is conventionally referred to as a mobile unit in "soft handoff" with the plurality of base stations.

Resources for communication between the base stations and the mobile units over the wireless communication links may be allocated using bits that are transmitted over channels of the wireless communication links. For example, power control bits may be transmitted from a base station to one or more mobile units over a shared channel. The power control bits may be used by the mobile units to adjust reverse link transmission powers used to transmit information from the mobile units to the base station. The base station transmits each power control bit at a power level that may be selected based upon a desired bit error rate or frame error rate associated with the transmitted power control bit. However, the overall power budget for transmitting power control bits may be limited to a maximum total power. In some cases, the sum of the power levels selected to transmit the power control bits may exceed the maximum total power budget. Conventional base stations may therefore scale down, or clip, the power levels for the power control bits so that the sum of the power levels is less than the maximum total power budget.

Scaling down the power levels used to transmit the power control bits may increase the number of error bursts on the reverse link and, consequently, may degrade the quality of the wireless communication link. For example, when a mobile unit is in soft handoff with a large number of base stations in an active set, many of the legs may be relatively weak, which may increase the probability that the base stations may transmit power control bits including UP commands over the associated legs. The error rate for the power control bits transmitted over the relatively weak legs may be larger than the error rate for relatively strong legs, so the probability that the mobile unit may incorrectly decode an UP command as a DOWN command when the associated power control bit is sent over a relatively weak leg may also be larger. A single incorrectly decoded UP command may cause the mobile unit to erroneously decrease its reverse link transmission power. For example, the mobile unit typically applies a voting rule to adjust the reverse link transmission power. In one exemplary voting rule, the mobile unit will adjust its reverse link transmission power downward if it receives at least one DOWN command in a power control bit received over one of the legs in the active set.

Reducing a reverse link transmission power based on an incorrectly decoded power control bit (e.g., interpreting an UP command as a DOWN command) may lead to one reverse link packet error or a burst of reverse link packet errors. A burst of reverse link packet errors may degrade the overall performance of the wireless communication link. Frequent bursts of errors experienced by some mobile units may lead to reduction of overall reverse link radiofrequency capacity. For example, outer loop power control systems implemented in base stations typically respond to reverse link errors by increasing a set point, which may be used to determine whether to transmit an UP command or a DOWN command in each power control bit. Conventional techniques increase the set point by a relatively large step size when a frame is successfully decoded and decrease the set point by a relatively small step size when a frame is unsuccessfully decoded. Accordingly, a burst of errors can increase the set point relatively rapidly, whereas the set point may not return to a nominal target value until a relatively large number of frames have been decoded successfully. The high set point of one of the mobile stations determined by a base station may lead to an increase of reverse link transmission powers for all the mobile units that are in communication with the base station because they may need to overcome the interference from the mobile station with the high set point. Consequently, an erroneously high set point may degrade the overall performance and capacity of the wireless communication system.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for allocating resources in a wireless communication system. The method may include selecting at least one resource control bit that is not to be transmitted. The at least one resource control bit is selected based on at least one priority associated with the at least one resource control bit.

BRIEF DESCRIPTION OF THE DRAWINGS

The invention may be understood by reference to the following description taken in conjunction with the accompanying drawings, in which like reference numerals identify like elements, and in which.

Figure 1:
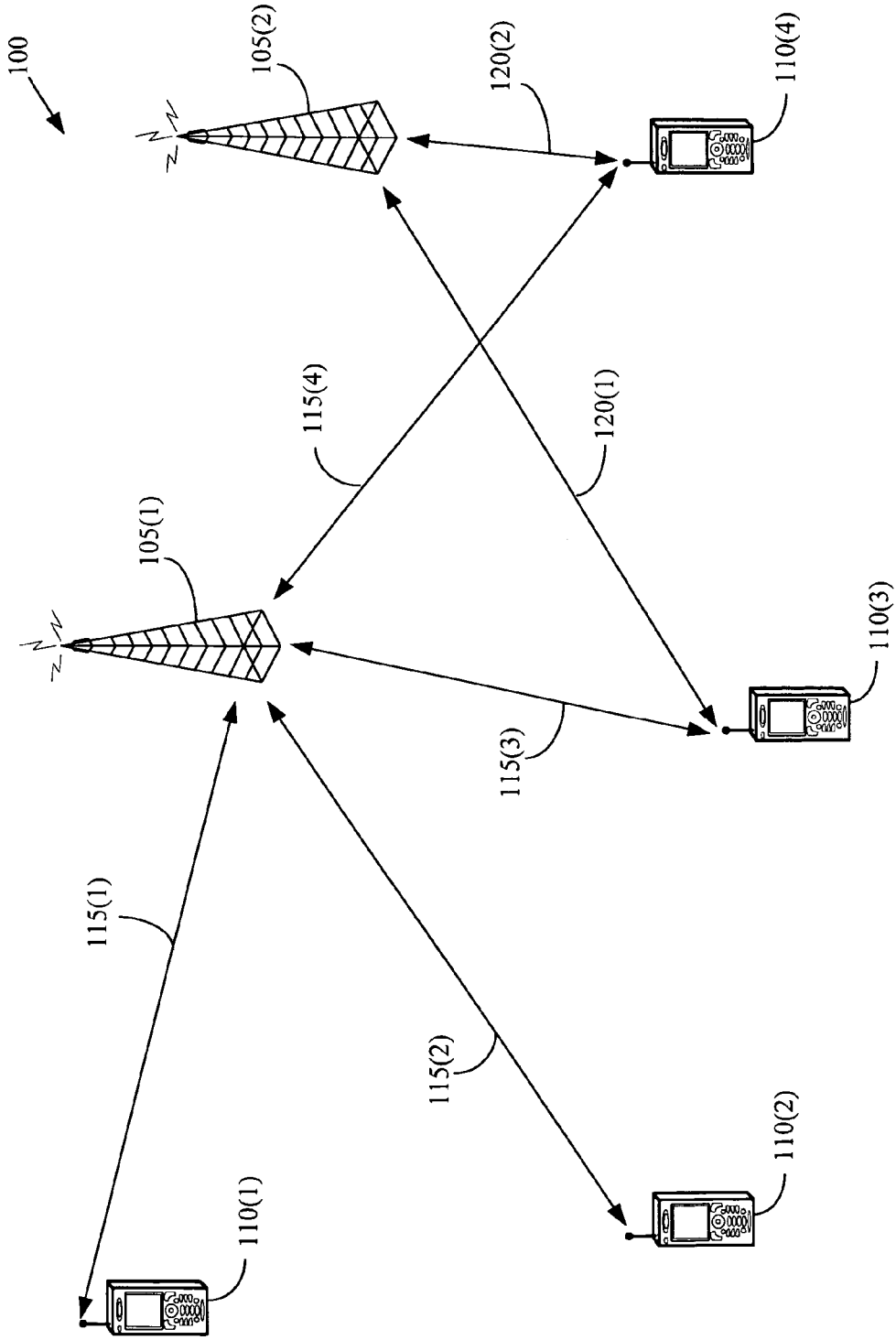
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a plurality of base stations 105(1-2). Although two base stations 105(1-2) are shown in FIG. 1, persons of ordinary skill in the art should appreciate that any number of base stations 105(1-2) may be deployed in the wireless communication system 100. The base stations 105(1-2) provide wireless connectivity according to one or more wireless communication protocols. In the illustrated embodiment, the base stations 105(1-2) provide wireless connectivity according to a high rate packet data (HRPD) system protocol such as an Evolved, Data-Optimized (EVDO) protocol, an Evolved, Data-Voice (EVDV) protocol, a High Speed Downlink Packet Access (HSDPA) protocol, and the like. However, the present invention is not limited to these protocols and in alternative embodiments any communication protocol may be used.

The base stations 105(1-2) provide wireless connectivity to one or more mobile units 110(1-4). Exemplary mobile units 110(1-4) may include, but are not limited to, cellular telephones, personal data assistants, smart phones, text messaging devices, laptop computers, desktop computers, and the like. In the illustrated embodiment, the base station 105(1) provides wireless connectivity to the mobile units 110(1-4) over the wireless communication links 115(1-4) and the base station 105(2) provides wireless connectivity to the mobile units 110(3-4) over wireless communication links 120(1-2). The wireless communication links 115(1-4), 120(1-2) may also referred to as legs 115(1-4), 120(1-2). Although a single double-headed arrow is used to represent the legs 115(1-4), 120(1-2), persons of ordinary skill in the art should appreciate that the legs 115(1-4), 120(1-2) may represent one or more channels, including one or more downlink (or forward link) channels and/or one or more uplink (or reverse link) channels.

In the illustrated embodiment, the mobile unit 110(3) is in communication with the base stations 105(1-2) via the legs 115(3), 120(1) and the mobile unit 110(4) is in communication with the base stations 105(1-2) via the legs 115(4), 120 (2). Accordingly, the mobile units 110(3-4) are in soft handoff with the base stations 105(1-2), which are in the active sets of the associated mobile units 110(3-4). Persons of ordinary skill in the art should appreciate that in alternative embodiments more or fewer base stations 15(1-2) may be in the active sets of the mobile units 110(1-4). Moreover, either of the base stations 105(1-2) may serve as the serving base station for the mobile units 110(3-4) that are in soft hand off.

The base stations 105(1-2) may transmit one or more resource control bits to the mobile units 110(1-4) over the legs 115(1-4), 120(1-2). The mobile units 110(1-4) can use the resource control bits to allocate one or more resources, e.g., one or more resources associated with transmission on a reverse link. In the illustrated embodiment, the base stations 105(1-2) transmit the one or more resource control bits over one or more shared channels on a forward link and the shared resources used to transmit the resource control bits may be subject to one or more limitations. In the embodiments described below, the resource control bits are assumed to be power control bits that the mobile units 110(1-4) may use to allocate power for transmission on a reverse link. The power control bits are transmitted over a shared channel and the total power available to transmit the power control bits is limited to a maximum total power, $P_{max}$. However, the resources that may be controlled according to the present invention are not limited to transmission powers. In alternative embodiments, the present invention may be used to allocate other shared resources such as channel codes, time slots or intervals, and the like, and control information other than power control bits may be transmitted.

The base stations 105(1-2) can determine power levels that are used to transmit the power control bits to the mobile units 110(1-4). However, the sum of the allocated power levels may exceed the total power budget for transmitting the power control bits, i.e. the maximum total power, $P_{max}$. Accordingly, the base stations 105(1-2) may prioritize the power control bits and then use the priorities associated with the power control bits to select one or more power control bits that are not to be transmitted to one or more of the mobile units 110(1-4). For example, one or more of the lowest priority power control bits may be omitted so that the sum of the allocated power levels associated with the remaining higher priority power control bits is less than the total power budget for transmitting the power control bits, i.e. the maximum total power, $P_{max}$.

In one embodiment, the power control bits may be prioritized such that an acceptable reliability (e.g., as measured by a bit error rate or a frame error rate) is maintained for more important power control bit transmissions, while the less important transmissions could be omitted at the base station 105(1-2). The importance of the power control bit may be evaluated along several dimensions, as will be discussed in detail below, and this technique may be extended to include more considerations in the priority calculation. By implementing various embodiments of the techniques described herein, reverse link performance degradation and/or capacity degradation may be reduced, or avoided, by maintaining a reliable power control loop on the higher priority legs 115(1-4), 120(1-2). Overall power may be saved or conserved by omitting power control bits on the lower priority legs 115(1-4), 120(1-2) that are less critical to the stable operation of the power control and/or the lower priority legs 115(1-4), 120(1-2) where the power control bit error transmissions are more likely to result in the error burst condition.

Figure 2:
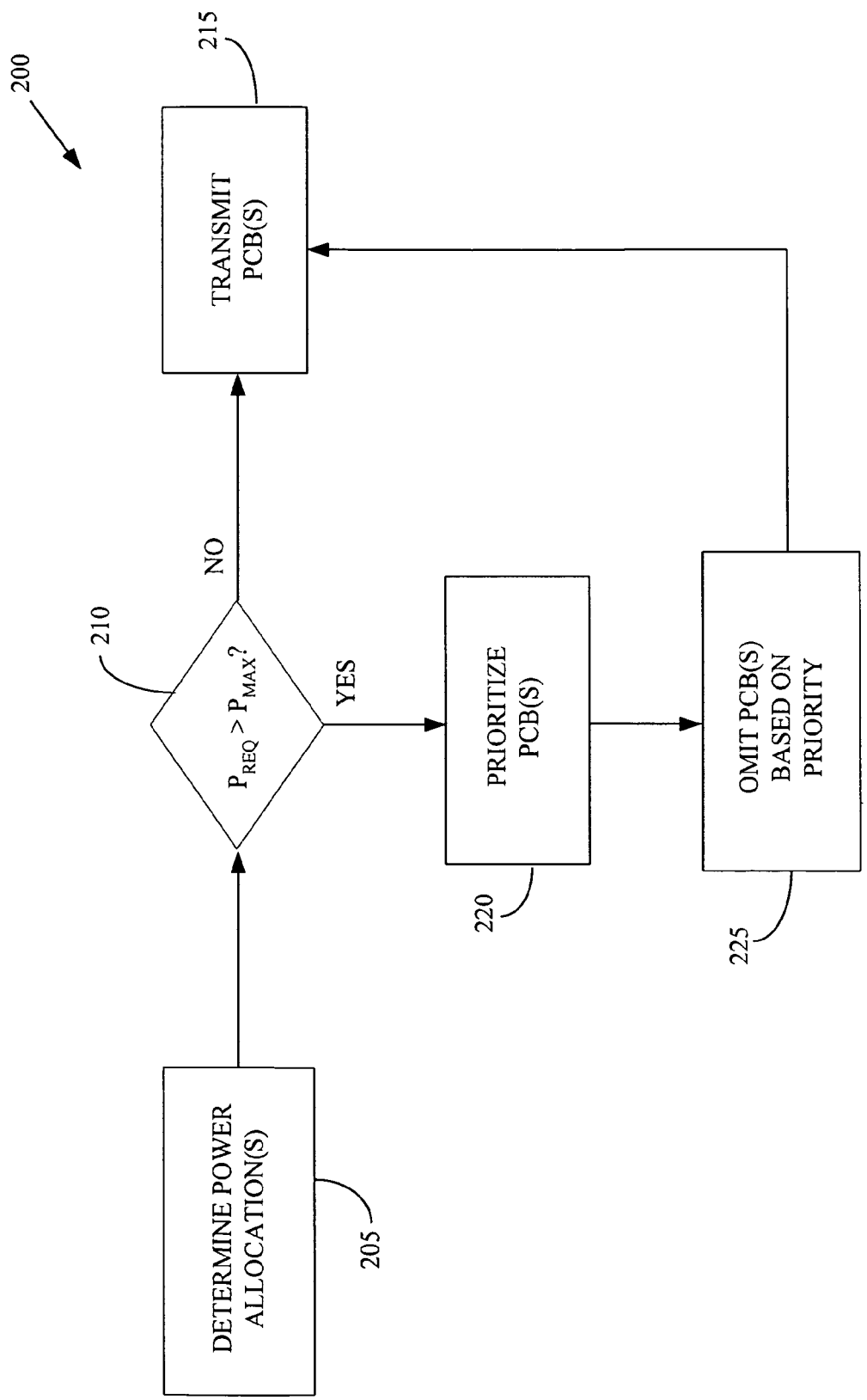
FIG. 2 conceptually illustrates one exemplary embodiment of a method of selecting power control bits based on a prioritization, in accordance with the present invention.

FIG. 2 conceptually illustrates one exemplary embodiment of a method 200 of prioritizing power control bits and selecting power control bits based on the prioritization. In the illustrated embodiment, a base station, such as the base stations 105(1-2) shown in FIG. 1, determines (at 205) one or more power allocations $p_i$ associated with one or more power control bits that are intended to be transmitted to one or more mobile units, such as the mobile units 110(1-4) shown in FIG. 1. For example, the base station may calculate the power allocations necessary for reliable delivery of all power control bits in the next power control interval under the assumption of unconstrained overall power. In the illustrated embodiment, the base station determines (at 205) the power allocations $p_i$ for each connection or leg (indicated by the subscript i) that is included in the power control loops controlled by the base station. The total required power for the power allocations $p_i$ is $$P_{req} = \sum_{i}^{M} p_i,$$

where M is the number of connections or legs under the base station's power control.

The base station determines (at 210) whether or not the total required power exceeds the power budget associated with the power control bits. If the total power budget could be met by allocating the required power to all power control bits, i.e., $P_{req} \leq P_{max}$, then the base station may allocate the power allocations $p_i$ to each connection or leg. Alternatively, the base station may scale up the power allocations and allocate $$p_i \left( \frac{P_{max}}{P_{req}} \right)$$

to each connection or leg. The base station may then transmit (at 215) the one or more power control bits to the one or more mobile units.

If the base station determines (at 210) that the total power budget cannot be met by allocating the required power to all the power control bits, i.e., $P_{req} > P_{max}$, then the base station may prioritize (at 220) the one or more power control bits. In one embodiment, a priority function $W_i$ may be calculated in each power control interval for each connection or leg i. For example, a priority function $W_i$ may be computed using the polynomial $$W_i = \sum_{n=0}^{N-1} a_{n,i} M^n,$$

where N is the number of priority categories used to classify the "importance" of the power control bit transmission and $a_{n,i}$ is the polynomial coefficient value for the connection or leg i in the priority category n. Examples of priority categories and polynomial coefficients that may be used to determine the priority function $W_i$ are shown in Table 1.

TABLE 1

| | | |
|---|---|---|
| n = 0 | $a_{0,i}$ = $f\{p_i\}$ | Required power allocations $p_i$ are sorted in the order of increasing power requirements. f( ) is a uniformly decreasing function of $p_i$. |
| n = 1 | $a_{1,i}$ = 0 | If the power control command is "UP" and if call is in soft handoff |
| | $a_{1,i}$ = 1 | If the power control command is "DOWN" and if call is in soft handoff or, if for any power control command if call is in simplex or softer only. |
| n = 2 | $a_{2,i}$ = 0 | if the base station is not the serving base station for the call |
| | $a_{2,i}$ = 1 | if the base station is the serving base station and the call is in soft handoff with another base station |
| | $a_{2,i}$ = 2 | if call is in simplex or softer handoff connection with this base station only |

The base station may then omit (at 225) one or more power control bits from the list of power control bits that are to be transmitted based on the determined priority. For example, after the value of priority function $W_i$ is calculated, the connections or legs may be sorted in the order of decreasing priority, as indexed by j. The first M' power control bits may then be selected for transmission, where $$M' = \arg\sum_{m}^{m-1}\sum_{j=0} \tilde{p}_j \leq P_{max},$$

and $\tilde{p}_j = s_j p_j$ is the scaled power for reliable transmission of the power control bit for connection j. The scaling factor $s_j$ is in the range from 0 to 1 and, in various alternative embodiments, could be set as a function of the priority category from Table 1, e.g. as a function of the handoff scenario associated with each leg. For example, the scaling factor $s_j$ could be set to higher values for simplex calls and lower values for handoff non-serving legs. The scaling factor $s_j$ could also be set as a function of the power control command that is being sent in the power control bit (e.g., an UP or DOWN command). In the illustrated embodiment, the value of the scaling factor $s_j$ corresponds to the lowest tolerable power level at which the power control bit could be received at an acceptable error rate performance. Bits associated with connections or legs that do not belong to the subset of indices selected for transmission according to above criterion are omitted (at 225).

The base station may then transmit (at 215) the power control bits that have been selected for transmission. In one embodiment, the selected bits are transmitted using power allocations $\tilde{p}_j$. Alternatively, the selected bits are scaled and transmitted with the power allocation $$\tilde{p}_j \left( \frac{P_{max}}{\sum_{j=1}^{M'-1} \tilde{p}_j} \right).$$

The power control bits that were omitted (at 225) are not transmitted (at 215).

Omitting (at 225) one or more power control bits based on one or more priorities associated with the power control bits may provide a number of advantages over conventional practice. In the illustrated embodiment, when power control bits are selected for transmission or omission according to the priority function $W_i$ using the parameters shown in Table 1, the likelihood of error bursts may be reduced. For example, the power control bits belonging to mobile units that are in simplex (or softer only) connection with a base station, which are set to transmit a DOWN command, and which have the smallest power allocation requirement, will have the highest priority. On the other hand, the power control bits for mobile units that are in soft handoff with a non-serving base station, which are set to transmit an UP command, and which require the largest amount of power will have the lowest priority.

Omitting (at 225) one or more power control bits that have the largest power requirement may enable the base station to transmitted a larger number of power control bits that are destined to other mobile units that have smaller power requirements. Also, the power control bits that require the largest amount of power may be destined to the mobile units associated with the worst radiofrequency and/or path loss conditions in the sector and therefore these power control bits are most likely to suffer decoding errors at the mobile unit. Accordingly, omitting (at 225) these high power bits altogether may be preferable to scaling them down to a lower transmission power, which may increase the probability that these power control bits may be decoded incorrectly.

When the call is in soft handoff, omitting (at 225) power control bits representing an UP command may be less costly to system performance than omitting (at 225) power control bits representing a DOWN command. For example, if a power control bit representing the UP command is received and/or decoded in error (perhaps because of excessive scaling of power and bad RF quality) and is interpreted as a DOWN command at the mobile unit, then the risk of triggering the burst of frame errors on the reverse link may be increased due to an excessive powering down of the mobile transmission. Accordingly, it may be preferable not to transmit any command at all rather than to transmit the UP command that has a high probability of turning into a DOWN command through erroneous reception. The error performance of the DOWN command may have a smaller impact on end user performance when the call is in soft handoff. If the DOWN command is received and/or decoded incorrectly as an UP command, and at least one other leg of the call sends a DOWN command that is correctly received by the mobile unit, then there may be no degradation due to the voting rule. If the power control bits on the other legs are decoded as an UP command, the mobile unit could raise its power un-necessarily. However, this erroneous short rise in power may not be as harmful to system performance as the erroneous short power drop. In one embodiment, when the call is in simplex or softer only mode, the importance of UP and DOWN commands may be relatively similar. Therefore, it is possible in some embodiments that for $\alpha_{2,j}=0$ and $\alpha_{2,j}=1$, $\alpha_{1,i}$ could always be set to the same value whether the UP or DOWN command is to be transmitted, e.g. $\alpha_{1,i}=1$.

Omitting (at 225) one or more power control bits from secondary non-serving legs of a call may provide better system performance than transmitting them with high probability of error. Typically, secondary non-serving legs of a call are the weaker legs in the soft handoff active set and they may be more prone to reverse link packet errors. Thus, secondary non-serving legs of a call are more likely to transmit the UP command and be ignored as a result of the voting rule where the DOWN command always wins. If the secondary non-serving legs are ignored anyway, there may be a minimal impact if they don't transmit altogether. However, if they do transmit and are received in error, the consequences might be very negative since the voting rule would take the erroneous DOWN commands from these legs into account. Although the mobile unit may select legs from which to apply the power control bits based on their strength, the base station may try to compensate for the weakness of the secondary handoff legs by allocating their power control bits more power. However, this compensation may be very crude because it may be based on feedback to the serving base station indicating the strength of its signal and not on the strength of the secondary legs. Therefore, the likelihood of errors on these bits in the loaded scenario may be high. One solution may be to omit (at 225) these bits altogether if the total power budget cannot be satisfied subject to acceptable bit error performance.

Persons of ordinary skill in the art should appreciate that the present invention is not limited to determining (at 220) priorities using the priority function $W_i$ and the parameters listed in Table 1. In one alternative embodiment, more or fewer priority values may be created within the category n=2. For example, all soft handoff legs could be combined under the same value of $\alpha_{2,i}=0$ independent of whether this leg is serving or not. Alternatively, the users for whom this leg is serving independent of their handoff situation could be combined under the same value of $\alpha_{2,i}=1$ or additional values of $\alpha_{2,j}$ could be assigned for soft handoff scenarios with large numbers of legs (e.g., more than 2 or 3 legs) or for the different combinations of soft-softer handoffs. In alternative embodiments, other constraints could be imposed if the leg is in softer handoff within this base station and/or in soft handoff with another base station. For example, if one of the softer legs decides to omit one or more power control bits, the other leg(s) may also omit the one or more power control bits, or if one of the legs decides not to omit the bit, the other leg may transmit it as well. In addition to the three priority categories shown in Table 1, other categories could be defined. For example, if the user's power control bit has been omitted from transmission on several previous occasions, its priority could be lifted via another priority category with the higher polynomial order and a non-zero coefficient value. This would ensure that the mobile units get controlled at least at some slower but guaranteed rate during the times of power overload. The order of priority categories (e.g., categories n=1 and/or n=2) could be changed depending on the designer's goals by reversing the values assigned to the category n.

Although the above description prioritizes connections based on the priority function, $W_j$, other implementations are possible to achieve the same goal of selecting a subset of the connections for which the power control bits should be transmitted reliably using available power budget. For example, the implementation may prioritize the connections by using the rules specified above but without explicitly calculating the $W_j$ values, or the implementation could use a calculation of a priority function but in a different form from the polynomial described above.

Persons of ordinary skill in the art should also appreciate that this scheme could be applied to the resource allocation of other control information in addition to power control bits. For example, automatic repeat request (ARQ) channel transmissions of acknowledgement (ACK) and/or negative acknowledgement (NAK) indications under the power resource limitation could also be prioritized based on the handoff scenario, the relative risk of erroneous decoding of a particular command with respect to user and system performance, the voting rule used by the mobile when applying the commands received from different handoff legs and the required power allocation for each connection The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of wireless communication, comprising:
selecting at least one resource control bit that is not to be transmitted, the at least one resource control bit being selected based on at least one priority associated with the at least one resource control bit.

2. The method of claim 1, comprising determining the at least one priority associated with the at least one resource control bit.

3. The method of claim 2, wherein determining the at least one priority comprises determining the at least one priority based upon at least one of a number of wireless communication legs, at least one resource control command associated with the resource control bit, at least one allocated resource associated with the at least one resource control bit, and a maximum value of a resource.

4. The method of claim 3, wherein determining the at least one priority based upon the number of wireless communication legs comprises determining the at least one priority based upon a number of wireless communication legs with base stations in an active set.

5. The method of claim 3, wherein determining the at least one priority based upon at least one resource control command associated with the resource control bit determining a lower priority for at least one UP command on at least one soft handoff leg.

6. The method of claim 2, wherein determining the at least one priority comprises determining the at least one priority based upon whether at least one resource control bit has been previously selected for non-transmission.

7. The method of claim 2, wherein determining the at least one priority comprises determining the at least one priority based upon at least one other selection of one or more resource control bits that are not to be transmitted.

8. The method of claim 2, wherein determining the at least one priority comprises determining the at least one priority based on a resource control polynomial.

9. The method of claim 2, comprising sorting the resource control bits based upon the at least one priority.

10. The method of claim 9, wherein selecting the at least one resource control bit that is not to be transmitted comprises selecting at least one resource control bit having the lowest priority.

11. The method of claim 1, comprising transmitting at least one resource control bit that is not the selected resource control bit.

12. The method of claim 1, wherein selecting the at least one resource control bit comprises selecting at least one power control bit.

13. The method of claim 12, comprising determining at least one transmission power associated with the at least one power control bit.

14. The method of claim 13, wherein determining the at least one transmission power comprises scaling the at least one transmission power based upon the at least one priority associated with the at least one power control bit.

15. The method of claim 1, wherein selecting the at least one resource control bit comprises selecting at least one bit indicative of at least one of a channel code, a time slot, and an automatic repeat request.

* * * * *